United States Patent [19]

Schroeder et al.

[11] 3,936,409

[45] Feb. 3, 1976

[54] UREA-URETHANE COMPOSITIONS AND FILMS PREPARED THEREFROM

[75] Inventors: Herbert M. Schroeder; Paul C. Stievater, both of Williamsville, N.Y.

[73] Assignee: Textron, Inc., Providence, R.I.

[22] Filed: Aug. 2, 1971

[21] Appl. No.: 168,463

Related U.S. Application Data

[63] Continuation of Ser. No. 805,813, March 10, 1969, abandoned, which is a continuation-in-part of Ser. No. 791,202, Nov. 4, 1968, abandoned, which is a continuation of Ser. No. 650,181, June 30, 1967, abandoned.

[52] U.S. Cl...... 260/30.2; 260/31.2 N; 260/31.4 R; 260/32.6 NR; 260/32.8 N; 260/33.2 R; 260/33.4 UR; 260/33.6 UB; 260/75 NH
[51] Int. Cl.$^2$.....................C08G 18/06; C08K 5/05; C08K 5/20; C08K 5/34
[58] Field of Search ... 260/32.6 N, 77.5 TN, 435 A, 260/75 NH, 75 NK, 75 NP, 30.2, 32.6 NR

[56] References Cited
UNITED STATES PATENTS

| | | | |
|---|---|---|---|
| 2,929,800 | 3/1960 | Hill, Jr. | 260/77.5 AM |
| 2,973,333 | 2/1961 | Katz | 260/32.6 N |
| 2,999,839 | 9/1961 | Arvidson, Jr. et al. | 260/32.6 N |
| 3,004,945 | 10/1961 | Farago | 260/32.6 N |
| 3,248,373 | 4/1968 | Barringer | 260/77.5 |
| 3,352,830 | 11/1967 | Schmitt et al. | 260/77.5 AT |
| 3,401,190 | 9/1968 | Schmitt et al. | 260/77.5 AT |

*Primary Examiner*—Allan Lieberman
*Attorney, Agent, or Firm*—Morton, Bernard, Brown, Roberts & Sutherland

[57] ABSTRACT

Urethane prepolymer compositions are made from 1-isocyanato-3-isocyanatomethyl-3,5,5-trimethyl cyclohexane and polyols at a total NCO to OH ratio of at least 1.2:1, and the prepolymers are reacted with cycloaliphatic polyamines to give urea-urethanes. The urea-urethanes can be formed as films such as coatings on a substrate or as indpendent sheets or the urea-urethanes can be formed materials of greater thickness. The products exhibit good strength, high resistance to the discoloring effects of ultraviolet light, elastomeric and other desirable properties. Often the urea-urethane is prepared in solution but this may not be the procedure where the urethane prepolymer and polyamine are combined and more or less immediately placed in the desired form as a film or other article such as is done using a two component spray gun.

The polyol component of the composition has as its major component aliphatic polyol having a molecular weight of at least about 500. The glycols, especialy the polyether glycols, are suitable polyol reactants. A variety of polyamines can be employed and cycloaliphatic diamines are preferred reactants.

The prepolymers can contain about 1 to 15 weight percent of free isocyanate groups and the prepolymers are often of application viscosity, at least when in a solvent, even when derived from a polyol component containing a significant proportion of polyol having three or more hydroxyl groups and therefore exhibit cross-liking tendencies. Cured coatings made from the urea-urethanes exhibit outstanding resistance to the discoloring action of ultraviolet light rays and possess other desirable properties such as good adherence to substrates and excellent abrasion resistance and strength.

15 Claims, No Drawings

UREA-URETHANE COMPOSITIONS AND FILMS PREPARED THEREFROM

This application is a streamline continuation of our application Ser. No. 805,813, filed Mar. 10, 1969, now abandoned, which in turn is a continuation-in-part of our application Serial No. 791,202, filed November 4, 1968, which in turn is a continuation of our application Serial No. 650,181, filed June 30, 1967, both abandoned.

This invention relates to polyurethane compositions. More particularly, the invention concerns polyurethanes made from prepolymers formed from 1-isocyanato-3-isocyanato-methyl-3,5,5-trimethyl cyclohexane and aliphatic polyols. These prepolymers are reacted with cycloaliphatic polyamines, often in the presence of a solvent for the prepolymer and the resultant urea-urethane compositions; and upon evaporation of solvent, if present, the urea-urethanes are solid materials of exceptional properties. The urea-urethanes can be formed as coatings on various substrates, as independent film or sheet materials or used in other desirable applications. The urea-urethanes exhibit outstanding resistance to the degradative and yellowing action of ultraviolet light rays. The cured urea-urethanes, moreover, are stable, possess excellent abrasion, strength and elongation properties and when applied as coatings the urea-urethanes adhere firmly to various suitable substrates.

It has been known for several years that aromatic polyurethanes which have been cured by reaction of free residual isocyanate groups in the polymer with moisture in the air, become increasingly yellow on continued exposure to sunlight. Since light from an ultraviolet lamp gives a similar effect and since sunlight contains light of wave length in the ultraviolet range, it is apparent that the ultraviolet part of the spectrum of sunlight causes most of the yellowing. Urethanes made from aromatic diisocyanates yellow to the greatest extent, but polyurethanes made from several aliphatic diisocyanates also yellow significantly, although less, when exposed to ultraviolet light. Furthermore, even though these aliphatic diisocyanates are relatively advantageous in this regard there may be difficulties in producing satisfactory urethanes from these diisocyanates, especially where the urethane prepolymer is made from aliphatic polyol having at least three hydroxyl groups and thus is cross-linked with a tendency to form intractable gels before being cured.

By the present invention, we have discovered that prepolymer polyurethanes containing free isocyanate groups, said prepolymers being derived essentially from 1-isocyanato-3-isocyanatomethyl-3,5,5-trimethyl cyclohexane, whose structural formula is

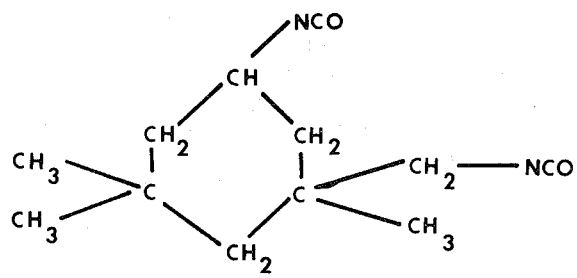

and one or more aliphatic polyols, can be reacted with cycloaliphatic polyamines to form urea-urethane polymers having highly desirable characteristics. The urea-urethane polymers exhibit excellent resistance to yellowing under the influence of ultraviolet light, and at the same time the resulting urea-urethanes possess other desirable properties needed in polyurethane compositions. Even the prepolymers derived from this diisocyanate and polyol components composed in part or entirely of polyols having three or more hydroxyl groups, can be made to remain in an essentially liquid state and are highly suitable prepolymer compositions. Although the essential isocyanate used in making our prepolymers is 1-isocyanato-3-isocyanatomethyl-3,5,5-trimethyl cyclohexane minor amounts of other polyisocyanates may be present providing the compositions are not unduly deleteriously affected, for instance, the use of aromatic diisocyanates lowers the resistance of the urea-urethane polymers to the effects of ultraviolet light and the presence of diisocyanato dicyclohexyl methane makes the prepolymers more susceptible to gellation. German patent No. 1,202,785 and Belgium patent No. 666,023, disclose 1-isocyanato-3-isocyanatomethyl-3,5,5-trimethyl cyclohexane which can be made by phosgenation of 1-amino-3-aminomethyl-3,5,5-trimethyl cyclohexane, preparation of the latter being described in Belgium patent No. 621,259.

Due to the high resistance of the 1-isocyanato-3-isocyanatomethyl-3,5,5-trimethyl cyclohexane-derived urea-urethane polymers to the deteriorating and yellowing action of ultraviolet light we can prepare clear compositions which remain of considerably lighter color than those produced from many isocyanates, especially the aromatic diisocyanates such as toluene diisocyanates. Moreover, when our compositions are colored, for instance through the addition of pigments, they remain stable over prolonged periods, whereas urea-urethanes derived from other diisocyanates may darken continually on exposure to light, for example, when the urea-urethanes are stored in transparent containers. Thus, the urea-urethanes of the present invention have potentially wider areas of use than most urea-urethanes heretofore available and our compositions can, for instance, be employed in clear or pigmented, non-yellowing wood finishes such as floor finishes and marine finishes; in other non-yellowing and non-chalking finishes; for coating chromed surfaces and various plastics such as vinyl fabrics; and for many other uses. This great potential for the compositions of our invention is further made possible since our urea-urethanes have high strength and excellent abrasion resistance and hardness, do not crack or mar easily and have good substrate and intercoat adhesion properties so that when used as coatings they resist peeling and blistering upon weathering. The urea-urethane compositions can also be used, among other things, as laminants, adhesives, flocculants and elastomers.

The urethane prepolymers of the invention are essentially made by reaction of 1-isocyanato-3-isocyanatomethyl-3,5,5-trimethyl cyclohexane with urethane-forming aliphatic polyols, a major weight portion of which polyol component has a molecular weight of at least about 500, and the prepolymers are often in the essentially liquid state either as the polymer per se or dissolved in a solvent. The prepolymer is generally stable in the sense that it will not cure to an insoluble solid unless further contacted with water, aliphatic polyol or other active-hydrogen containing material. These prepolymers can have a free isocyanate group content of about 1 to 15, often at least about 2 and preferably about 3 to 7, weight percent based on polymer content or solids. The prepolymer-forming reaction mixture generally contains a ratio of total isocyanate groups to total hydroxyl radicals of at least 1.2:1, often up to about 3:1 or more. The ratio of isocyanate groups to hydroxyl groups can affect the properties of the compositions, but undesirable results can be offset by using, when making the prepolymer, a polyol of appropriate molecular weight. With a given prepolymer, increases in the ratio of NCO to OH provide coatings of greater film hardness and mar resistance while flexibility and impact resistance may be adversely affected, but these effects can be modified by using a longer chain polyol.

An essential component used in making the prepolymer compositions of the present invention is, as noted, one or more aliphatic polyols. The polyols may contain a minor amount of aliphatic polyols having a molecular weight below about 500 or phenolic polyol. The polyol is preferably composed to a major molar extent of diol including the ether diols, although triols or other polyols having greater than three hydroxyl groups as well as their mixtures with diols can be employed. The polyols, thus for the most part, have at least two hydroxyl groups attached to aliphatic carbon atoms, and may be selected from a wide variety of polyhydroxyl materials which may be aliphatic, including cycloaliphatic, hydrocarbon compounds, including substituted-hydrocarbon compounds. The polyol may often have a molecular weight of up to about 5000 or more, but preferably has a molecular weight of about 750 to 3000.

Among the wide variety of polyols which can be used in this invention are those represented by the formula:

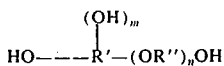

in which R' is an aliphatic hydrocarbon radical, preferably saturated, and R'' is an alkylene radical of 2 to 4, preferably 2 to 3, carbon atoms, R' preferably has 2 to 12, advantageously 2 to 6, carbon atoms. The letter n represents a number from 0 to about 50, depending on the molecular weight desired, while the letter m is 0 to 2 or more. When n is other than O, R' may often be the same as R''.

Suitable aliphatic alcohols include the polyether glycols of up to about 5000 or more molecular weight, such as the polyethylene glycols, polypropylene glycols, and polybutylene glycols. The latter materials include the straight chain polybutylene glycols often referred to as polytetramethylene ether glycols, as well as the branched chain polybutylene glycols, for instance, made from 1,2-and 2,3-butylene oxides and designated below in the specific examples as polybutylene glycols. There can also be employed the hydroxy-containing polymers of olefinically-unsaturated monomers, especially of the dienes such as the hydroxy-terminated polybutadienes. Among the relatively low molecular weight polyols which can be present are trimethylol propane, butane diols, trimethylol ethane, 1,6-hexamethylene glycol, 1,2,6-hexanetriol, glycerol, etc.

Others among the polyols useful in the invention include the hydroxy esters such as caster oil, polyol-modified castor oils, other polyol-modified fatty oils and hydroxy-terminated polyesters. The hydroxy-terminated polyester materials are generally made by reaction of one or more polyhydroxy materials, such as the aliphatic polyols mentioned above, with one or more aliphatic, including cycloaliphatic, or aromatic polycarboxylic acids or esters, and such polyesters can often have hydroxyl values in the range of about 25 to 150. Frequently in these polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, dimers of olefinically-unsaturated monocarboxylic acids, such as linoleic acid dimer, etc. Modified castor oil partial esters can be made by ester interchange of the oil with polyols such as low molecular weight polyols, including glycols, glycerine, pentaerythritol etc.

The reaction of diisocyanates with polyols does not of necessity give satisfactory prepolymer compositions. Thus, the isocyanate-polyol prepolymers are stable and preferably in an essentially liquid state, at least when in a solvent. There is a greater tendency to produce intractable prepolymer gels when the polyol contains a crosslinking component which has at least three hydroxyl groups per molecule, yet such cross-linked prepolymers, if of proper viscosity, are highly desirable compositions.

The difficulty encountered with cross-linked prepolymers is illustrated by the fact that when a mixture of trimethylolpropane polyoxypropylene triol of about 1000 molecular weight and butylene glycol (2:1 mol ratio) was reacted with diisocyanato dicyclohexyl methane at an NCO to OH ratio of 1.65:1, an intractable gel was obtained. When, however, this isocyanate was replaced with an equivalent amount of 1-isocyanato-3-isocyanatomethyl-3,5,5-trimethyl cyclohexane, a liquid composition of application viscosity was produced. Thus, the prepolymer compositions of the present invention include those in which at least a portion of the polyol reactant has at least three hydroxyl groups per molecule such as those mentioned before, including the polyols of the defined formula where m is 1 to 2, e.g., trimethylol propane, trimethylol ethane, 1,2,6-hexanetriol, etc., and their alkylene-oxide derived polyethers. Such cross-linking aliphatic polyols often have about 3 to 12, preferably about 3 to 6, carbon atoms, although their polyethers can have molecular weights of at least about 500. By using the cross-linking polyols with 1-isocyanato-3-isocyanatomethyl-3,5,5-trimethyl cyclohexane, lesser amounts of the diisocyanate can be employed and still obtain an ungelled prepolymer vehicle than when the diisocyanate is, for instance, diisocyanato dicyclohexyl methane. Also the 1-isocyanato-3-isocyanatomethyl-3,5,5-trimethyl cyclohexane permits the use of large amounts of the cross-linking polyol without obtaining gels. When the polyol component used in making the prepolymer contains cross-linking polyol, essentially the entire polyol may have at least about three hydroxyl groups per molecule, but large amounts of such polyol or polyols of high functionality may preclude the formation of elastomers. It may be desirable to limit the hydroxyl groups supplied by the cross-linking polyol to up to about 30, preferably up to about 10, mole percent based on total hydroxyl groups.

The polyurethane-type prepolymer reaction products of the present invention can be made by simultaneous reaction of excess 1-isocyanato-3-isocyanatomethyl-3,5,5-trimethyl cyclohexane and polyol. Alternatively, the diisocyanate can be reacted with part or all of one or more of the polyols prior to the reaction with the remaining portion of these materials. Stepwise mixing of the diisocyanate with the polyols may be used to enhance temperature control. The reaction temperatures for making the various urethane prepolymers of the present invention are often in the range of about 40° to 150°C., with about 50 to 130°C. being preferred; and the reaction is preferably continued until there is essentially little, if any, unreacted hydroxyl functionality remaining. As noted above wide variations in the nature and amounts of the polyol or polyol mixtures used in the preparation of the compositions of this invention can be made without materially affecting the stability of the compositions.

Catalysts can be used in forming the prepolymers to accelerate the rate of reaction. Typically the catalysts can be organotin compounds, for example dibutyl tin dilaurate and stannous octoate. Other useful catalysts include tertiary aliphalic and alicyclic amines, such as triethyl amine, triethanol amine, tri-n-butylamine, triethylene diamine, alkyl morpholines and the like. Complex mixtures containing such catalysts in modified form may also be employed.

The prepolymers of the present invention may be prepared in the presence of solvent which is essentially inert in this system. The solvent serves to insure that the reactants are in the liquid state and the solvent permits better temperature control during the reaction by serving as a heat sink and, if desired, as a refluxing medium. Various solvents including mixtures of such materials may be employed and among the useful organic solvents are aromatic hydrocarbons, esters, ethers, keto-esters, ketones, glycolether-esters, chlorinated hydrocarbons, pyrrolidones, hydrogenated furans, and the like, and mixtures thereof. Frequently, the solvents are volatile materials which will be removed from the composition while it cures, and in such case, there may be no need to remove any portion of the solvent from the reaction product prior to use. The amount of solvent employed may vary widely and large volumes may be uneconomic or give materials with undesirably or inconveniently low viscosity. Often about 0.01 to 6 weights of solvent, preferably about 0.03 to 3 weights of solvent, per weight of the total isocyanate and polyol in the prepolymer are used. Among the suitable normally liquid solvents are toluene, xylene, ethylbenzene, 2-ethoxyethyl acetate, 1,1,1-trichloroethane, methyl isobutyl ketone, dimethylformamide, dimethylsulfoxide, dioxane, N-methyl pyrrolidone, tetrahydrofuran, etc. and their mixtures; and it is preferred that the solvent not contain more than about 10 carbon atoms per molecule.

In preparing the urea-urethane compositions of this invention, the urethane prepolymer of 1-isocyanato-3-isocyanatomethyl-3,5,5-trimethyl cyclohexane and polyol, can be reacted with the polyamine in the presence of a solvent for the prepolymer and the resulting urea-urethane, to obtain a solution of the urea-urethane in the solvent. Since the solution has no substantial free isocyanate content the urea-urethane cures to a solid at least primarily through evaporation of the solvent, for instance, after forming the solution as a film, e.g. as a coating or sheet, or other article. The urea-urethane solution can be referred to as a lacquer-type vehicle.

The urea-urethane can also be made by combining the urethane prepolymer which may be in a solvent to obtain a suitable viscosity, with the polyamine and the total amount or character of the solvent being such that the urea-urethane when formed is not in solution. Since under these conditions curing of the urea-urethane gives a solid in a very short time, the combination of the prepolymer and polyamine can be placed in desired form, e.g., as a film, etc., more or less immediately after the combination is made. This result can be accomplished for instance by spraying the prepolymer and polyamine separately from a two-headed spray gun onto a suitable substrate.

The amounts of the urethane prepolymer and polyamine reacted and the reaction conditions are chosen so that substantially all of the isocyanate content of the prepolymer is reacted on a weight basis. Since an approximately stoichiometric amount of polyamine is used the free isocyanate content of the urea-urethane is less than about 1 or 2 weight percent based on polymer solids. Often this free isocyanate content is less than about 0.5 percent and is preferably about 0.0 percent. The urea-urethane-forming reaction can be conducted at ambient temperatures and generally the reaction temperature is in the range of about 10° to 120° C. or more, preferably about 50° to 100° C. The urea-urethane-forming reaction may, if desired, be catalyzed, for instance, by the use of catalysts similar to those mentioned above with respect to the urethane prepolymer-forming reaction. When the urea-urethane solution is cured the evaporation of solvent can be facilitated by the application of elevated temperatures. The cured polymer is non-cellular as distinguished from a foam.

Among the solvents which can be present during the urea-urethane-forming reaction are the various organic solvents such as aromatic hydrocarbons; oxygen-containing hydrocarbons, including alcohols, esters, ethers, glycol ether esters, ketones and amides; ring nitrogen-containing organic materials including the pyrrolidones; as well as chlorinated hydrocarbons and the like; and mixtures thereof. Solvents in which the major component by weight is dimethylformamide, or N-methyl-2-pyrrollidone, have been found to be especially suitable.

The solvent may be similar to those employed in the urethane-forming reaction or different solvents may be used in each reaction, and the solvent is essentially inert in this system. Solvents present during the urea-urethane-forming reaction are relatively volatile materials which will be removed from the composition while it cures to solid form. Although the amount of solvent employed during the urea-urethane-forming reaction is conveniently that which will give a solution of application viscosity, lesser or greater amounts of solvent can be employed. Often about 1 to 10 weights of solvent per weight of the total prepolymer and polyamine are used. The urea-urethane solution is generally of suitable viscosity when the polymer solids comprise about 15 to 50 weight percent of the solution.

Specific solvents which can be employed in the urea-urethane-forming reaction often can have up to about 10 carbon atoms and include those mentioned above with respect to the urethane prepolymer-forming system, with the proper attention being given to the degree of solubility exhibited by the prepolymer and the urea-urethane in a given solvent and the potential for reaction between the solvent and the polymer-forming materials. Thus, ethyl alcohol has been successfully used since its reactivity with the NCO of the urethane prepolymer is slower than that of the polyamine.

The cycloaliphatic polyamines used to make the urea-urethanes of this invention can be selected from a wide variety of suitable materials. Thus, the polyamine has at least about two amino ($-NH_2$) groups per molecule. Often the polyamine has up to about 40 or more carbon atoms, preferably about 6 to 15 carbon atoms, and may contain other substituents which may be reactive or non-reactive with isocyanate groups. The preferred polyamines are diamines and the cycloaliphatic structures are especially advantageous, particularly to impart to the products improved resistance to the degradative and yellowing effects of ultraviolet light. Thus the urea-urethanes prepared from aromatic amines such as methylene dianiline, have exhibited relatively poor resistance against the deleterious effects of ultraviolet light. Among the useful polyamines are 1-amino-3-aminomethyl-3,5,5-trimethyl cyclohexane, hydrogenated di-(aminophenyl)methane, hydrogenated methylene dianiline, diaminomenthane and hydrogenated tolylene diamine.

The urea-urethanes of this invention can be employed in any way desired to take advantage of the characteristics of the products, for instance, the urea-urethanes may be used as coatings, adhesives, laminants or flocculants or formed into relatively thick sheets or other film-like materials. Due to the elastomeric properties of the products they may be applied and employed in a manner to take advantage of such characteristics. The film-type products generally have a thickness of up to about 100 mils or more and often the coating compositions have a thickness of up to about 10 mils. The urea-urethanes can be formed into various materials or articles of greater cross-sectional dimensions, and the solutions can be employed in the various ways known in the art for utilization of these type of materials. The compositions can contain additives to impart special properties such as plasticizers, pigments, fillers, etc., also the solid substrates bearing the coating may be specially treated materials, including flammable members impregnated with fire-resistant chemicals or coated with a sealant.

The following examples will serve to illustrate the present invention. In the usual technique the polyol component was initially azeotroped to remove water, and subsequently the urethane-prepolymer-forming reaction as well as that producing the urea-urethane, was conducted under an inert gas atmosphere in the usual manner. Blending of the prepolymer and the polyamine was at room temperature in each of the examples. The percents NCO are reported on the basis of the total weight of the vehicle.

EXAMPLE I

A mixture of 1000 grams of polypropylene glycol of 1025 molecular weight, 340 grams of polypropylene glycol of 2025 molecular weight and 75 grams of xylene was charged to a glass, tree-neck flask equipped with a reflux condenser, a Dean Stark water trap, thermometer, stirrer, an electrically heated glass mantle and a nitrogen inlet tube. The mixture was heated under azeotropic distillation conditions at 245°–249°C. for one hour and cooled to 30°C. Five hundred four grams of 1-isocyanato-3-isocyanatomethyl-3,5,5-trimethyl cyclohexane were added to this mixture and no noticeable exotherm occurred. The mixture was heated under nitrogen to 80°C. and held at 80°–85°C. for nine hours to obtain the calculated percent NCO. After cooling, the resulting prepolymer analyzed 90.3 percent nonvolatile material, Gardner color 1 minus, Gardner viscosity Z-1 ½ and free isocyanate (NCO) 5.16 percent.

One hundred grams of the prepolymer and 390 grams of dimethyl formamide were mixed in a Waring Blender. Ten and four-tenths grams of 1-amino-3-aminomethyl-3,5,5-trimethyl cyclohexane were added to the mixture and blended in for five minutes. The lacquer vehicle thereby formed analyzed 21.1 percent nonvolatile, Gardner color 1 minus, Gardner viscosity A and free isocyanate (NCO) 0.0 percent. Eight fluid ounces of the lacquer were poured to a teflonlined pan and cured at 140°F. for 24 hours and then at 77°F. and 50 percent humidity for three days. The approximate thickness of the sheet formed was 60 mils. The tensile strengths of two test pieces of the sheet were 1396 and 1229 psi with elongations of 620 and 630 percent respectively. After a five hour exposure under a 400 watt ultraviolet lamp at 18" distance, there was a very slight yellowing of the sheet showing the excellent resistance of this polyurethane composition to exposure to ultraviolet light.

EXAMPLE II

One hundred grams of the prepolymer whose preparation is described in Example I were mixed with 390 grams of dimethyl formamide in a Waring Blender. Nine and seven-tenths grams of 2,4,4-trimethyl hexamethylene-1,6-diamine were added and blended in for five minutes. The lacquer vehicle thereby formed analyzed 20.1 percent nonvolatile material, Gardner color 1 minus, Gardner viscosity A-1 and free isocyanate (NCO) 0.0 percent. Eight fluid ounces of the lacquer were poured into a teflon-lined pan and cuved at 140°F. for 26 hours and then at 77°F. and 50 percent humidity for 3 days. The approximate thickness of the film or sheet formed was 75 mils. A tensile strength test of the film was run but the film did not break at an elongation of 1,320 percent. After a 5 hour exposure of this film under a 400 watt mercury vapor ultraviolet lamp at 18" distance, there was only slight yellowing of the sheet showing the excellent resistance of this polyurethane composition to exposure to ultraviolet light.

EXAMPLE III

A mixture of 450 grams of polybutylene glycol of 1000 molecular weight, 153 grams of polybutylene glycol of 1500 molecular weight and forty grams of xylene was charged to a reaction flask provided with a reflux condenser, thermometer, nitrogen inlet tube, a stirrer, Dean Stark water trap and an electrically heated glass mantle. The mixture was azeotroped at 234°C. for 1 hour. The mixture was then cooled to 80°C. and 226 grams of 1-isocyanato-3-isocyanatomethyl-3,5,5-trimethyl cyclohexane were added under nitrogen. The temperature of the batch was maintained at 80°C. for 4 hours. After cooling the resulting prepolymer analyzed 90.8% non-volatile material, Gardner color 1 minus, Gardner viscosity Z1+2/3 and free isocyanate 4.47 percent.

100 grams of the prepolymer were dissolved in 290 grams of dimethyl formamide and put into a Waring Blender. While the solution was stirring, 10.5 grams of methylene dianiline dissolved in 100 grams of dimethyl formamide were added. This mixture was stirred for 5 minutes until the solution was homogeneous. The lacquer formed thereby analyzed 26.5% nonvolatile material, free isocyanate 0.33 percent, Gardner viscosity A4 and Gardner color 6 minus. This lacquer was then poured into a teflon-coated pan and heated for 3 days at 140°F., then 5 days at 77°F. and 50 percent relative humidity. The sheet so prepared had an approximate thickness of 72 mils. Two test specimens cut from this sheet showed tensile strengths of 1647 and 1680 psi and elongations of 550 and 610 percent, respectively.

EXAMPLE IV

A mixture of 450 grams of polytetramethylene ether glycol of 1020 molecular weight, 206 grams of polytetramethylene glycol of 2100 molecular weight and 43 grams of xylene was charged to a reaction flask provided with a reflux condenser, thermometer, nitrogen inlet tube, a motor driven stirrer, a water trap and an electrically heated glass mantle. The mixture was heated under azeoptropic conditions at 226°C. for 1 hour to dry it. The mixture was then cooled to 50°C. and 226 grams of 1-isocyanato-3-isocyanatomethyl-3,5,5-trimethyl cyclohexane were added under nitrogen. The temperature of the mixture was maintained at 80°C. for 5 hours. After cooling the resulting prepolymer analyzed 94.2 percent nonvolatile material, Gardner color 1 minus, Gardner viscosity Z6+1 ½ and free isocyanate (NCO) 4.38 percent.

One hundred grams of the prepolymer were dissolved in 190 grams of dimethylformamide and put in a Waring Blender. While the solution was stirring, 8.85 grams of methylene dianiline dissolved in 100 grams of dimethylformamide were added. This mixture was stirred for five minutes until the solution was homogeneous. The lacquer produced in this manner analyzed 26.7 percent nonvolatile material, free isocyanate 0.24 percent, Gardner viscosity A1 and Gardner color 6 plus. The lacquer was then poured into a teflon-coated pan and heated for 3 days at 140°F. and allowed to remain for 5 days at 77°F. and 50 percent relative humidity. The sheet thus prepared had an approximate thickness of 77 mils. Two test specimens cut from the sheet had tensile strengths of 4938 and 6111 psi and elongations of 550 and 535 percent, respectively.

EXAMPLE V

One hundred grams of the prepolymer whose preparation is described in Example I were mixed with 390 grams of dimethyl formamide in a Waring Blender. Seven and two-tenths grams of hexamethylene-1,6-diamine were added and blended in for 5 minutes. The lacquer vehicle thereby formed analyzed 19.3 percent nonvolatile material, Gardner color 1 minus, Gardner viscosity A-1 and free isocyanate (NCO) 0.0 percent. Eight fluid ounces of the lacquer were poured into a teflon-lined pan, cured at 140°F. for 24 hours and at 77°F. and 50 percent humidity for 3 days. The approximate thickness of the resin film or sheet formed was 70 mils. A tensile strength test of the film was run but the film did not break at an elongation of 1,350 percent.

After a 5 hour exposure under a 400 watt ultraviolet lamp at 18" distance, there was only slight yellowing of the sheet showing the excellent resistance of this polyurethane composition to exposure to ultraviolet light as compared with the usual yellowing that occurs when similar resins made from aromatic diisocyanates are exposed to ultraviolet light.

EXAMPLE VI

There were charged to a reaction flask suitable for conducting the preparation of a polyurethane prepolymer 800 grams of polypropylene glycol of 1025 average molecular weight and 272 grams of polypropylene glycol of 2025 average molecular weight and 50 grams of xylene. This mixture was heated for one hour at about 236°C. to remove water and dry the mixture. The mixture was then allowed to cool to a little below 70°C. when 476 grams of 1-isocyanato-3-isocyanatomethyl-3,5,5-trimethyl cyclohexane were added with continuous stirring under a blanket of gaseous nitrogen during the whole process. Simultaneously with the addition of the diisocyanate 1.5 grams of dibutyl tin dilaurate were added. After an exothermic reaction occurred with the temperature of the mixture rising to 70°C., external heating was applied by means of a glass heating mantle and the temperature raised to and maintained at 95°C. for about 3 ½ hours when the free isocyanate (NCO) of the mixture was 6.25 percent. The prepolymer product had a nonvolatile of 93.4 percent, Gardner viscosity of Z2 and a Gardner color of 1. This prepolymer was cured in a teflon-lined pan as described in the previous examples and reported in the table below, using 1-amino-3-aminomethyl-3,5,5-trimethyl cyclohexane as the curing agent.

| Prepolymer, grams | 50.0 | 50.0 |
|---|---|---|
| 1-amino-3-aminomethyl-3,5,5-trimethylcyclohexane, grams | 6.25 | 6.25 |
| N-methyl-2-pyrrolidone, grams | 155.8 | — |
| Dimethyl formamide | — | 155.8 |
| Nonvolatile, percent | 25 | 25 |
| Viscosity after one week, (Gardner) | D | C |
| Cure at 150°F., hours | 43 | 43 |
| Tensile, psi | 1829 | 1555 |
|  | 1722 | 1632 |
|  | 1558 | 1638 |
| Elongation, % | 550 | 325 |
|  | 555 | 330 |
|  | 585 | 345 |

EXAMPLE VII

A mixture of 450 grams of polypropylene glycol of 1025 molecular weight, 153 grams of polypropylene glycol of 2025 molecular weight, 60 grams of 1,4-butylene glycol and 70 grams of xylene was charged to a glass, three-neck flask equipped with a reflux condenser, a Dean Stark water trap, thermometer, stirrer, an electrically heated glass mantle and a nitrogen inlet tube. Three hundred ninety grams of 1-isocyanato-3-isocyanatomethyl-3,5,5-trimethyl cyclohexane were added to this mixture under nitrogen and no noticeable exotherm occurred during the formation of urethane. The mixture was heated to 85°C. and held at 85°-90°C. for 2 hours to obtain the calculated percent free isocyanate (NCO). After cooling the resulting prepolymer analyzed 92.5 percent nonvolatile material, Gardner color 1 minus, Gardner viscosity Z-10 and free isocyanate (NCO) 3.82 percent.

Fifty grams of the prepolymer and 150 grams of dimethyl formamide were mixed in a Waring Blender. A mixture of 4.5 grams of methylene dianiline and 40 grams of dimethyl formamide was added to the blender and blended in for five minutes. The lacquer vehicle thereby formed analyzed 21.5 percent nonvolatile material, Gardner color 3 ½, Gardner viscosity A-1 and free isocyanate (NCO) 0.0 percent. Fifty grams of the lacquer were poured into a teflon-coated pan and cured at 140°F. for 24 hours and then at 77°F. and 50 percent humidity, for 3 days. The approximate thickness of the sheet formed was 18 mils. The tensile strengths of three test pieces of the sheet were 6258, 6844 and 6063 psi with elongations of 430, 440 and 410 percent, respectively. The drying time of a 3 mil wet film of this vehicle or lacquer was 2 hours at 77°F. and 50 percent humidity.

EXAMPLE VIII

A mixture of fifty grams of the prepolymer made in Example VII and 190 grams dimethyl formamide was placed in a Waring Blender and mixed thoroughly. Five and one-tenth grams of 1-amino-3-aminomethyl-3,5,5-trimethyl cyclohexane were added to the mixture and blended in for five minutes. The lacquer vehicle thereby formed analyzed 21 percent nonvolatile material, Gardner color 1 minus, Gardner viscosity A-1 and free isocyanate (NCO) 0.0 percent. Fifty grams of the lacquer were poured into a teflon-coated pan and cured at 140°F. for 24 hours and then at 77°F. and 50 percent humidity for 3 days. The approximate thickness of the sheet formed was 22 mils. The tensile strengths of three test pieces of the sheet were 2073, 2255 and 2174 psi with elongations of 560, 580 and 560 percent, respectively. After a 5 hour exposure under a 400 watt ultraviolet lamp at 18'' distance, there was no noticeable yellowing of the lacquer film. The drying time of a 3 mil wet film of this vehicle was 2 hours at 77°F. and 50 percent humidity.

EXAMPLE IX

Twenty-five grams of the prepolymer made in Example VII were mixed with seventy grams of dimethyl formamide. A mixture of 1.5 grams of tolylene diamine and 30 grams of dimethyl formamide was then added to the prepolymer mixture. The mixture was stirred five minutes. The lacquer thereby formed analyzed 20.1 percent nonvolatile material, Gardner color 6 ½, Gardner viscosity A-4 and free isocyanate (NCO) 0.26 percent. Fifty grams of the lacquer were poured into a teflon-coated pan and cured at 140°F. for 24 hours and then at 77°F. and 50 percent humidity for 3 days. The approximate thickness of the sheet formed was 24 mils. The tensile strengths of two test pieces of the sheet were 5179 and 5283 psi with elongations of 530 and 565 percent, respectively. The drying time of a 3 mil wet film of this vehicle was 2 hours at 77°F. and 50 percent humidity.

EXAMPLE X

A mixture of 167 grams polyethylene glycol of 1000 molecular weight, 38 grams of 4,4'-isopropylidenediphenol and 30 grams of xylene was charged to a glass, three-neck flask equipped with a reflux condenser, a Dean Stark water trap, thermometer, stirrer, an electrically heated glass mantle and a nitrogen inlet tube. The mixture was heated under azeotropic distillation conditions at 162°C. for 1 hour and then cooled to 30°C. One hundred and eleven grams of 1-isocyanato-3-isocyanatomethyl-3,5,5-trimethyl cyclohexane were added to this mixture under nitrogen. No noticeable exotherm occurred during the formation of urethane. The mixture was heated to 85°C. and held at 85°-95°C. for 27 hours to obtain the calculated percent NCO. After cooling the resulting prepolymer analyzed 91 percent nonvolatile material, Gardner color 8 ½, Gardner viscosity Z-7 ½ and free isocyanate (NCO) 4.31 percent.

Twenty-five grams of the prepolymer were mixed with 60 grams of dimethyl formamide. A mixture of 2.6 grams of methylene dianiline and 38 grams of dimethyl formamide was added to the prepolymer mixture and blended for five minutes. The lacquer vehicle thereby formed analyzed 21 percent nonvolatile material, Gardner color 4 ½, Gardner viscosity A-3 and free isocyanate (NCO) 0.1 percent. Fifty grams of the lacquer were poured into a teflon-coated pan and cured at 140°F. for 24 hours and then at 77°F. and 50 percent humidity for 3 days. The approximate thickness of the sheet formed was 16 mils. The tensile strengths of three test pieces of the sheet were 4933, 4675 and 3624 psi with elongations of 400, 375 and 335 percent, respectively. The drying time of a 3 mil wet film of this vehicle was 2 hours at 77°F. and 50 percent humidity.

EXAMPLE XI

Twenty-five grams of the prepolymer made in Example X were mixed with 98 grams of dimethyl formamide. Three and five-tenths grams of 1-amino-3-aminomethyl-3,5,5-trimethyl cyclohexane were added to the mixture which was stirred for five minutes. The lacquer vehicle thereby formed analyzed 22.5 percent nonvolatile material, Gardner color 2 ½, Gardner viscosity A-4 and free isocyanate (NCO) 0.0 percent. Fifty grams of the lacquer were poured into a teflon-coated pan and cured at 140°F. for 24 hours and then at 77°F. and 50 percent humidity for 3 days. The approximate thickness of the sheet formed was 20 mils. The tensile strengths of three test pieces of the sheet were 1600, 1660 and 1583 psi with elongations of 370, 400 and 470 percent, respectively. The drying time of a 3 mil wet film of this vehicle was 2 hours at 77°F. and 50 percent humidity.

EXAMPLE XII

A mixture of 180 grams of the polypropylene oxide adduct of 1,2,6-hexanetriol of 720 average molecular weight, 35.7 grams of 4,4-isopropylidenediphenol, 153 g. Cellosolve acetate (ethylene glycol ethyl ether acetate) and 153 g. xylene was charged to a glass, three-neck flask equipped with a reflux condenser, a Dean Stark water trap, thermometer, stirrer, an electrically heated glass mantle and a nitrogen inlet tube. The mixture was heated under azeotropic distillation conditions at 150°C. for 1 hour and then cooled to 80°C. Two hundred and forty grams of 1-isocyanato-3-isocyanatomethyl-3,5,5-trimethyl cyclohexane were added to this mixture with no noticeable exotherm occurring. Four and six-tenths grams of dibutyl tin dilaurate were then added to the mixture. This addition caused the reaction to take place and the temperature to rise to 90°C. The mixture was cooled to 70°C. and held at 70°-78°C. for a period of two hours. After cooling the resulting prepolymer analyzed Gardner color 1 minus, Gardner viscosity D, 60 percent nonvolatile material and free isocyanate (NCO) 5.54 percent.

Twenty-five grams of the prepolymer were mixed with 50 grams of dimethyl formamide. A mixture of three and three-tenths grams of methylene dianiline and 13 grams dimethyl formamide was added to the prepolymer and stirred for 5 minutes. Sixty grams of the lacquer thereby formed were poured into a teflon-coated pan and cured at 140°F. for 24 hours and then at 77°F. and 50 percent humidity for three days. The approximate thickness of the sheet thus formed was 21 mils. The tensile strength of a test piece cut from this sheet was 2040 psi with 80 percent elongation as measured by an Instron tester. The drying time of a 3 mil wet film of this vehicle was 2 hours at 77°F. and 50 percent humidity.

EXAMPLE XIII

A mixture of 218 grams of polypropylene glycol 1025, 18.5 grams of 1,4 butylene diol, 56.5 grams of trimethylolpropane, 342.5 grams of Cellosolve acetate and 342.5 grams of xylene was charged to a reaction flask provided with a reflux condenser, thermometer, nitrogen inlet tube, a stirrer, a Dean Stark water trap and an electrically heated glass mantle. The mixture was heated under azeotropic distillation conditions at 143°C. for one hour. The mixture was then cooled to 60°C. and 392.5 grams of 1-isocyanato-3-isocyanatomethyl-3,5,5-trimethyl cyclohexane were added under nitrogen. The temperature of the mixture was maintained at 80°C. for 5 hours. After cooling the resulting prepolymer analyzed Gardner color 1 minus, Gardner viscosity D and free isocyanate (NCO) 4.27 percent.

Four and ninety five one hundredths grams of methylene dianiline were dissolved in 63 grams of dimethyl-formamide and added to 50 grams of prepolymer while being agitated vigorously. The resultant lacquer was poured into a teflon-coated pan and cured 24 hours at 140°F. and then 3 days at 77°F. and 50 percent relative humidity. The sheet from the pan had an approximate thickness of 38 mils. Two test specimens cut from the sheet showed tensile strengths of 3867 and 3651 psi and elongations of 160 and 170 percent, respectively.

EXAMPLE XIV

A mixture of 303 grams of polybutylene glycol of 1000 molecular weight, 42.5 grams of trimethylolpropane, 232 grams of xylene and 3.4 grams of 2,6-di-tertiary butyl-4-methyl phenol was charged to a reaction flask provided with a reflux condenser, thermometer, nitrogen inlet tube, a motor driven stirrer, a Dean Stark water trap and an electrically heated glass mantle. The mixture was heated under azeotropic distillation conditions at 125°C. for one hour in order to dry it. The mixture was then cooled to 38°C. and 343 grams of 1-isocyanato-3-isocyanatomethyl-3,5,5-trimethyl cyclohexane and 3.4 grams dibutyl tin dilaurate were added under nitrogen. After heating for 3 ½ hours at a maximum temperature of 100°C., 763 grams of xylene and 2.3 grams of magnesium Ten Cem drier containing 3 percent magnesium as magnesium neodecanoate were added and the mixture was heated at 130°C. for 8 hours. After cooling the resulting prepolymer analyzed 43.4 percent nonvolatile material, Gardner color 1 minus, Gardner viscosity B and free isocyanate (NCO) 2.90 percent.

Six and eigthy-five one hundredths grams of methylene dianiline were dissolved in 100 grams of dimethyl-formamide. This mixture was added to 100 grams of the prepolymer with rapid agitation. The lacquer vehicle thereby formed was then poured into a teflon-coated pan and cured for 24 hours at 140°F. followed by 3 days at 77°F. and 50 percent relative humidity. The sheet formed had an approximate thickness of 17 mils. A test specimen cut from this sheet showed a tensile strength of 6729 psi and an elongation of 45%.

EXAMPLE XV

Four hundred twenty four grams of polybutadiene diol of molecular weight 1060 and 30 grams of xylene were charged to a reaction flask provided with a reflux condenser, thermometer, nitrogen inlet tube, a stirrer, and an electrically heated glass mantle. To this mixture were added under nitrogen 111.0 grams of 1-isocyanato-3-isocyanatomethyl-3,5,5-trimethyl cyclohexane and 0.27 grams of dibutyl tin dilaurate. The mixture was heated to 80°C. and held for 3 hours at this temperature. After cooling the resulting prepolymer analyzed 4.41 percent free isocyanate (NCO).

Ten and four tenths grams of methylene dianiline were dissolved in 310 grams of dimethyl formamide. This mixture was added to 100 grams of prepolymer with agitation. The resulting lacquer was poured into a teflon-coated pan and cured at 140°F. for 24 hours then for five days at 77°F. and 50 percent relative humidity. The cured sheet had an approximate thickness of 21 mils. Two test specimens cut from this sheet showed tensile strengths of 1410 and 1295 psi and elongations of 150 and 120 percent, respectively.

EXAMPLE XVI

A mixture of 450 grams of polytetramethylene ether glycol of 1020 molecular weight, 206 grams of polytetramethylene ether glycol of 2100 molecular weight and 50 grams of xylene was charged to a reaction flask provided with a reflux condenser, thermometer, nitrogen inlet tube, a stirrer, a Dean Stark water trap and an electrically heated glass mantle. The mixture was heated under azeotropic distillation conditions at 226°C. for one hour. The mixture was then cooled to 50°C. and 226 grams of 1-isocyanato-3-isocyanatomethyl-3,5,5-trimethyl cyclohexane were added under nitrogen. The temperature of the mixture was maintained at 80°C. for 5 hours. After cooling the resulting propolymer analyzed 94.2 percent nonvolatile material, Gardner color one minus, Gardner viscosity Z6+½ and free isocyanate (NCO) 4.38 percent.

Ten and nine tenths grams of completely hydrogenated di-(4-aminophenyl) methane, i.e., di-(4-aminocyclohexyl)methane, were dissolved in 300 grams of dimethyl formamide. This solution was added to 100 grams of prepolymer while being stirred vigorously. The resultant lacquer was poured into a teflon-coated pan and cured for 24 hours at 140°F. and then 3 days at 77°F. and 50 percent relative humidity. The cured sheet had an approximate thickness of 36 mils. Two test specimens cut from the sheet showed tensile strengths of 5226 and 5056 psi and elongations of 580 and 630 percent, respectively.

EXAMPLE XVII

A mixture of 292 grams of 1-isocyanato-3-isocyanatomethyl-3,5,5-trimethyl cyclohexane, 7.5 grams dibutyl tin dilaurate and 322 grams of toluene was charged to a reaction flask provided with a reflux condenser, thermometer, nitrogen inlet tube, a motor driven stirrer, a Dean Stark water trap and an electrically heated glass mantle. The mixture was heated to 60°C. and 459 grams of diisocyanate-grade castor oil were fed into the reaction flask over a period of 1 hour. The temperature was held at 60°C. for 2 hours more and then 540 grams of xylene was added. After cooling the resulting prepolymer vehicle analyzed 45.9 percent nonvolatile material, Gardener color 1 minus, Gardner viscosity A2-¼ and free isocyanate (NCO) 3.11 percent.

Three and sixty six hundredths grams of methylene dianiline were dissolved in 80 grams of dimethyl formamide and the mixture was agitated vigorously while being mixed with 50 grams of the prepolymer. The resulting lacquer vehicle was then poured into a tefloncoated pan and cured for 24 hours at 140°F., then for three days at 77°F. and 50 percent relative humidity. The cured sheet had an approximate thickness of 29 mils. Two test specimens cut from this sheet showed tensile strengths of 1954 and 1563 psi and elongations of 115 and 185 percent, respectively.

EXAMPLE XVIII

A mixture of 135 grams of a polyester made from adipic acid and 1,4-butylene glycol having a hydroxyl value of 44 and an acid value of 1.2, 11.5 grams of 1,4-butylene glycol, 34.9 grams of trimethylolpropane, 4.0 grams of Ionol (2,6-di-tertiary butyl-4-methyl phenol), 199 grams of Cellosolve acetate and 199 grams of xylene was charged to a reaction flask provided with a reflux condenser, thermometer, nitrogen inlet tube, a motor driven stirrer, a Dean Stark water trap and an electrically heated glass mantle. The mixture was heated under azeotropic distillation conditions at 149°C. in order to dry it. The mixture was then cooled to 28°C. and 0.32 grams of dibutyl tin dilaurate and 213 grams of 1-isocyanato-3-isocyanatomethyl-3,5,5-trimethyl cyclohexane were added under nitrogen. The temperature of the mixture was maintained at 90°C. for 6 hours. After cooling the resulting prepolymer vehicle analyzed 49.9 percent nonvolatile material, Gardner color 1, Gardner viscosity N+⅛ and free isocyanate (NCO) 4.05 percent.

Four and seventy seven hundredths grams of methylene dianiline were dissolved in 90 grams of dimethyl formamide and the mixture was added to 50 grams of the prepolymer with vigorous agitation. The lacquer vehicle thereby formed was then poured into a tefloncoated pan and cured 24 hours at 140°F., then 3 days at 77°F. and 50 percent relative humidity. The cured sheet had an approximate thickness of 25 mils. Two test specimens cut from this sheet showed tensile strengths of 3217 and 3970 psi, respectively, and elongations of 55%.

Comparisons have been made of the urea-urethane compositions of this invention with similar compositions made from diisocyanates other than 1-isocyanato-3-isocyanatomethyl-3,5,5-trimethyl cyclohexane (IPDI) which also have a cycloaliphatic structure, i.e., completely hydrogenated tolylene diisocyanate ($H_6TDI$) and completely hydrogenated 4,4'-bis-(isocyanatophenyl)methane ($H_{12}MDI$). Data regarding these preparations are reported in the Table below and the compositions of the Table were prepared by procedures corresponding to that of Example I. The solvent added to the reaction forming the urea-urethane vehicles was chosen to obtain satisfactory solution of the solids. The Table reports three series of runs designated I, II and III, respectively, and in the first series the polyol employed was a mixture of polyoxypropylene glycols, while in series II and III, the polyol was of the hydroxy-terminated polyester type. For each of the diisocyanates and polyols several polyamines were used as identified in the Table. The urea-urethane elastomers obtained were evaluated with respect to tensile strength.

TABLE

| | Run | Diiso-cyanate (D) | Polyol (PO) | Mol Ratio D/PO | Prepolymer Tests | | | Poly-amine (PA) | Elastomer Tests | |
|---|---|---|---|---|---|---|---|---|---|---|
| | | | | | Wt.% Free NCO | Wt.% Solids | Vis. cs. at 25°C. or Gardner | | Tensile at Break, psi. | Elongation at Break, % |
| I | 1 | IPDI[1] | PPG-1025 and 2025[3] | 2.04 | 4.9 | 19.4 | 9.4 | $H_{12}MDA$[6] | 5300 | 495 |
| | 2 | $H_6TDI$[2] | PPG-1025 and 2025 | 2.00 | 3.2 | 21.0 | 0.68 | $H_{12}MDA$ | 2000 | 850 |
| | 3 | $H_{12}MDI$[10] | PPG-1025 and 2025 | 2.02 | 4.5 | — | — | $H_{12}MDA$ | | Gelled |
| | 4 | IPDI | PPG-1025 and 2025 | 2.04 | 4.9 | 19.6 | 0.92 | DAM[7] | 4200 | 555 |
| | 5 | $H_6TDI$ | PPG-1025 and 2025 | 2.00 | 3.2 | 21.4 | 0.34 | DAM | No Break | 1100 |
| | 6 | $H_{12}MDI$ | PPG-1025 and 2025 | 2.02 | 4.5 | 20 | — | DAM | 2900 | 580 |
| | 7 | IPDI | PPG-1025 and 2025 | 2.04 | 4.9 | 21.0 | $A_3$ | MDA[8] | 1600 | 550 |
| | 8 | $H_6TDI$ | PPG-1025 and 2025 | 2.00 | 3.2 | 21.2 | $A_4$ | MDA | Too Soft | Too Soft |
| | 9 | $H_{12}MDI$ | PPG-1025 and 2025 | 2.02 | 4.5 | 18.4 | 0.56 | MDA | Too Soft | Too Soft |
| | 10 | IPDI | PPG-1025 and 2025 | 2.04 | 4.9 | 19.5 | 2.65 | $H_6TDA$[9] | 5000 | 585 |
| | 11 | $H_6TDI$ | PPG-1025 and 2025 | 2.00 | 3.2 | 21.7 | 0.22 | $H_6TDA$ | Too Soft | Too Soft |
| | 12 | $H_{12}MDI$ | PPG-1025 and 2025 | 2.02 | 4.5 | 20.0 | — | $H_6TDA$ | | Gelled |
| II) | 1 | IPDI | TEG Polyester[4] | 2.00 | 5.8 | 19.2 | 36.8 | IPDA[2] | 7500 | 470 |
| | 2 | $H_6TDI$ | TEG Polyester | 2.00 | 3.6 | 20.7 | 2.15 | IPDA | 2000 | 600 |
| | 3 | $H_{12}MDI$ | TEG Polyester | 1.98 | 5.1 | 20.2 | 23.0 | IPDA | 7000 | 500 |
| | 4 | IPDI | TEG Polyester | 2.00 | 5.8 | 19.1 | 24.2 | $H_{12}$ MDA | 6000 | 390 |
| | 5 | $H_6TDI$ | TEG Polyester | 2.00 | 3.6 | 22.5 | 4.9 | $H_{12}MDA$ | 2300 | 500 |
| | 6 | $H_{12}MDI$ | TEG Polyester | 1.98 | 5.1 | 20.1 | 549 | $H_{12}MDA$ | 5000 | 400 |
| | 7 | IPDI | TEG Polyester | 2.00 | 5.8 | 19.1 | 1.2 | DAM | 6900 | 500 |
| | 8 | $H_6TDI$ | TEG Polyester | 2.00 | 3.6 | 22.2 | 1.15 | DAM | 1100 | 650 |
| | 9 | $H_{12}MDI$ | TEG Polyester | 1.98 | 5.1 | 20.2 | 4.2 | DAM | 2000 | 480 |

TABLE-continued

|  | Run | Diisocyanate (D) | Polyol (PO) | Mol Ratio D/PO | Prepolymer Tests | | | Polyamine (PA) | Elastomer Tests | |
|---|---|---|---|---|---|---|---|---|---|---|
|  |  |  |  |  | Wt.% Free NCO | Wt.% Solids | Vis. cs. at 25°C. or Gardner |  | Tensile at Break, psi. | Elongation at Break, % |
|  | 10 | IPDI | TEG Polyester | 2.00 | 5.8 | 19.2 | <0.2 | MDA | Too Soft | Too Soft |
|  | 11 | H₆TDI | TEG Polyester | 2.00 | 3.6 | 21.7 | 0.22 | MDA | 100 | 1000 |
|  | 12 | H₁₂MDI | TEG Polyester | 1.98 | 5.1 | 21.3 | 0.9 | MDA | 400 | 460 |
|  | 13 | IPDI | TEG Polyester | 2.00 | 5.8 | 19.2 | 2.3 | H₆TDA | 6800 | 570 |
|  | 14 | H₆TDI | TEG Polyester | 2.00 | 3.6 | 21.4 | 0.22 | H₆TDA | 86 | 450 |
|  | 15 | H₁₂MDI | TEG Polyester | 1.98 | 5.1 | 24.6 | 4.3 | H₆TDA | 300 | 250 |
| III) | 1 | IPDI | Polyester B⁽⁵⁾ | 2.00 | 4.9 | 19.7 | 69.2 | IPDA | 8000 | 555 |
|  | 2 | H₆TDI | Polyester B | 2.01 | 3.6 | 21.8 | 5.8 | IPDA | 4300 | 690 |
|  | 3 | H₁₂MDI | Polyester B | 2.00 | 4.4 | 20.5 | 4.0 | IPDA | 5000 | 500 |
|  | 4 | IPDI | Polyester B | 2.00 | 4.9 | 19.6 | 122.3 | H₁₂MDA | 7000 | 475 |
|  | 5 | H₆TDI | Polyester B | 2.01 | 3.6 | 20.5 | 3.21 | H₁₂MDA | 3200 | 665 |
|  | 6 | H₁₂MDI | Polyester B | 2.00 | 4.4 | 17.3 | 10.9 | H₁₂MDA | 6000 | 500 |
|  | 7 | IPDI | Polyester B | 2.00 | 4.9 | 19.5 | 4.4 | DAM | 6000 | 540 |
|  | 8 | H₆TDI | Polyester B | 2.01 | 3.6 | 21.3 | 2.1 | DAM | 3000 | 800 |
|  | 9 | H₁₂MDI | Polyester B | 2.00 | 4.4 | 20.3 | 80.4 | DAM | 4200 | 510 |
|  | 10 | IPDI | Polyester B | 2.00 | 4.9 | 19.9 | <0.22 | MDA | Too Soft | Too Soft |
|  | 11 | H₆TDI | Polyester B | 2.01 | 3.6 | 20.9 | 0.4 | MDA | Too Soft | Too Soft |
|  | 12 | H₁₂MDI | Polyester B | 2.00 | 4.4 | 20.0 | 1.8 | MDA | 3000 | 700 |
|  | 13 | IPDI | Polyester B | 2.00 | 4.9 | 19.8 | 9.9 | H₆TDA | 7000 | 570 |
|  | 14 | H₆TDI | Polyester B | 2.01 | 3.6 | 19.9 | A₃ | H₆TDA | 50 | 400 |
|  | 15 | H₁₂MDI | Polyester B | 2.00 | 4.4 | 20.6 | 247.8 | H₆TDA | 6000 | 640 |

⁽¹⁾ IPDI = 1-isocyanato-3-isocyanatomethyl-3,5,5-trimethyl cyclohexane
⁽²⁾H₆TDI = completely hydrogenated tolylene diisocyanate
⁽³⁾PPG-1025 and 2025 = a mixture of polyoxypropylene glycols of 1025 and 2025 molecular weight in the mole ratio of 5.8 in the IPDI examples, 5.2 in the H₆TDI examples and 5.7 in the H₁₂MDI examples
⁽⁴⁾TEG Polyester = a linear polyester diol prepared by interesterifying adipic acid and triethylene glycol until a hydroxyl number of about 120 is obtained
⁽⁵⁾Polyester B = a linear polyester diol prepared by interesterifying adipic acid and ethylene glycol until a hydroxy number of about 90 is obtained
⁽⁶⁾H₁₂MDA = completely hydrogenated methylene dianiline
⁽⁷⁾DAM = diaminomenthane
⁽⁸⁾MDA = methylene dianiline
⁽⁹⁾H₆TDA = completely hydrogenated tolylene diamine i.e., methylcyclohexyl diamine
⁽¹⁰⁾H₁₂MDI = completely hydrogenated 4,4'-bis(isocyanatophenyl)methane
⁽¹¹⁾All IPDI and H₆TDI-derived urea urethanes were formed with the addition of dimethylformamide solvent while the H₁₂MDI-derived products were formed with either dimethylformamide, N-methylpyrollidone, isopropanol or their mixtures as a solvent
⁽¹²⁾IPDA = 1-amino-3-aminomethyl-3,5,5-trimethylcyclohexane The data of the foregoing Table illustrate that the tensile strengths of the urea-urethanes made from IPDI and a given polyol and amine as compared with similar urea-urethanes made from H₆TDI, were at least about double those of the corresponding H₆TDI-derived products. In many cases, the H₆TDI-derived products gave such low tensile strength as to be virtually worthless as coating compositions, and in some instances the coatings were too soft to be useful. The IPDI-derived products also exhibited satisfactory elongation along with their high tensile characteristics. It should be noted that the urea-urethanes made from H₁₂MDI exhibit tensile strengths which were less than those shown by the foregoing described IPDI-derived urea-urethanes, in spite of the fact that H₁₂MDI is bicyclic and should therefore give elastomers of superior properties as compared with IPDI, a monocyclic aliphatic diisocyanate. The urea-urethanes made from cycloaliphatic diisocyanates are also advantageous since they exhibit resistance to discoloration upon exposure to ultraviolet light and thus urea-urethanes made from IPDI and having high tensile strength as illustrated in the above Table, exhibit a highly desirable combination of advantageous properties.

It is claimed:

1. A urea-urethane composition of urethane prepolymer of 1-isocyanato-3-isocyanatomethyl-3,5,5-trimethyl cyclohexane and aliphatic, hydroxy-terminated polyester polyol having a molecular weight of at least about 500, and a substantially stoichiometric amount of cycloaliphatic polyamine, said urethane prepolymer having a free isocyanate content of about 1 to 15 weight percent based on urethane solids.

2. The composition of claim 1 in which the polyamine is diamine.

3. The composition of claim 2 in which the urea-urethane is dissolved in an inert solvent.

4. The composition of claim 3 in which the free isocyanate group content of the urethane prepolymer is about 3 to 7 weight percent.

5. The composition of claim 2 in which the diamine is selected from the group consisting of di-(aminocyclohexyl) methane, diaminomethane and methylcyclohexyl diamine.

6. The composition of claim 2 in which the diamine is 1-amino-3-aminomethyl-3,5,5-trimethyl cyclohexane.

7. The composition of claim 6 in which the urea-urethane is dissolved in an inert solvent.

8. The composition of claim 3 in which the major portion of the solvent is dimethylformamide or N-methyl-2-pyrrolidone.

9. The composition of claim 8 in which the urethane prepolymer has a free isocyanate group content of about 3 to 7 weight percent.

10. A cured film of the composition of claim 1.
11. A cured film of the composition of claim 2.
12. A cured film of the composition of claim 4.
13. A cured film of the composition of claim 5.
14. A cured film of the composition of claim 6.
15. A cured film of the composition of cliam 9.

* * * * *

UNITED STATES PATENT AND TRADEMARK OFFICE
CERTIFICATE OF CORRECTION

PATENT NO. : 3,936,409

DATED : February 3, 1976

INVENTOR(S) : Herbert M. Schroeder and Paul C. Stievater

It is certified that error appears in the above-identified patent and that said Letters Patent are hereby corrected as shown below:

In the Abstract, line 29, correct the spelling of "cross-linking".

Column 4, line 4, correct the spelling of "castor".

Column 4, line 29, "cross-linking" should be hyphenated.

Column 4, line 36, the word "mol" should be --mole--.

Column 5, line 29, correct the spelling of "aliphatic".

Column 7, line 68, correct the spelling of "three-neck".

Column 8, line 23, hyphenate "teflon-lined", and after the word "poured" insert the word --in--.

Column 8, line 45, correct the spelling of "cured".

Column 18, in claim 5, line 46, the word "diaminomethane" should be --diaminomenthane--.

Signed and Sealed this

Twenty-third Day of May 1978

[SEAL]

Attest:

RUTH C. MASON
Attesting Officer

LUTRELLE F. PARKER
Acting Commissioner of Patents and Trademarks